Patented Apr. 14, 1925.

1,533,818

UNITED STATES PATENT OFFICE.

ROBERT C. STANLEY, OF NEW BRIGHTON, NEW YORK, ASSIGNOR TO THE INTERNATIONAL NICKEL COMPANY, OF NEW YORK, N. Y., A CORPORATION OF NEW JERSEY.

MANUFACTURE OF ALLOYS.

No Drawing. Application filed April 2, 1923. Serial No. 629,487.

*To all whom it may concern:*

Be it known that I, ROBERT C. STANLEY, a citizen of the United States, residing at New Brighton, in the county of Richmond and State of New York, have invented a new and useful Improvement in the Manufacture of Alloys, of which the following is a full, clear, and exact description.

My invention relates to an improved method of making alloys directly from their ores, and particularly nickel-copper alloys directly from an ore containing nickel and copper.

Heretofore, under the United States patent of Ambrose Monell, No. 811,239, dated January 30, 1906, the actual method used for making such alloys was as follows:

The ore, containing usually sulfides of nickel and copper, was smelted and the resulting matte was bessemerized. This matte was then charged into a hand operated roasting furnace and roasted or calcined therein until the sulphur was reduced to approximately one per cent. At this stage of the roasting process, approximately 10% of a flux (usually soda ash) was added to the charge. The flux was then worked into the charge and after further rabbling in the furnace the material was drawn out into buckets.

This oxide containing the flux was then leached with water to remove the soda and reduce the sulphur content to approximately .10%. The wet oxide was then dried and screened, the lumps being ground and returned to the screening operation. The screenings were then mixed with approximately 7% of soda ash and subjected to further calcining and leaching operations to produce a cold oxide containing not more than .01% of sulphur. This cold oxide usually containing approximately 10% of moisture.

The wet oxide obtained from the second calcining and leaching operations was then mixed with a proper percentage of charcoal, and charged into an acid open hearth furnace. A low sulphur fuel was necessary for this furnace, and consequently oil firing was used with oil having a low sulphur percentage. No sulphur could be eliminated in this operation, and hence a high sulphur fuel would increase the sulphur content of the metal produced and make it unsuitable for rolling. In this furnace, therefore, the fuel was of such a nature as not to increase the sulphur to any perceptible extent.

From this furnace the alloy metal was tapped out and cast into ingots, the oxygen of the oxides combining with the carbon and passing off as a gas.

My invention is designed to reduce the number of steps in the production of this material from the ore, and to reduce its cost. In carrying out my invention, I take the ground bessemerized matte produced from the nickel-copper ore, and charge it into a mechanical roasting furnace. In this furnace the matte is fed along and mechanically rabbled, the operation being continued until the sulphur is reduced preferably to about .25% or less. No flux is used in this step.

From this furnace, the hot calcined oxides are discharged into crane buckets, and as the material feeds into the buckets ground charcoal is fed into these buckets at the same time to an amount preferably more than that theoretically necessary to combine with the oxygen of the hot oxides. The original heat of the material discharged from the furnace is sufficient in and of itself to cause a reaction with the charcoal and reduce the major portion, or substantially all, of the material to the metallic form. The charcoal feed is preferably regulated or timed in accordance with the movement of the rabbles, and in place of charcoal, tar-coke, or other carbonaceous material may be added. The important feature of this step is that the heat of the oxide is utilized to give the reaction temperature for combining and carrying off the oxygen with the carbon. These reactions will ordinarily carry off about 90% of the oxygen, even when open crane buckets are used. This percentage of metallic materials could be increased if the receptacle were closed and the material held in it a longer time. I prefer to remove the material while it is still hot and before the reaction is complete and charge it into furnace; but I do not wish to be limited to this, as the material may be allowed to cool before charging it into a furnace for the next step.

It will be noted that in these operations the sulphur is not reduced to any such low amount as was formerly necessary before charging into the acid open-hearth furnace of the prior process.

In the next step of my process, in its preferred form, I charge the metallic and oxide material into a basic-lined furnace, preferably a basic-lined electric furnace. In this furnace, a basic slag is used, preferably by using ground limestone in connection with fluorspar. The fluorspar used in this step should be substantially free from lead, since the process would not produce a malleable nickel-copper alloy metal if the fluorspar contained sufficient lead to add more than .01% of lead to the alloy. In actual practice, this furnace has been an electric furnace of the Heroult type. In this furnace, the material is smelted and refined, while sulphur reduction proceeds under the action of the slag material and the sulphur is reduced in this furnace down to preferably less than .01%. From this furnace the metallic alloy is tapped out and cast into ingots in the ordinary manner.

If a basic-lined furnace other than an electric furnace is used in the last furnace step, the fuel may be any fuel desired, since sulphur reduction is carried on during this operation. In this case, it is economical to hold the carbon content of the metal at approximately .50% during elimination of sulphur; whereas in the electric furnace, it is only necessary to hold it above approximately .25%.

The advantages of my invention will be obvious to those skilled in the art. It is easier to produce a uniform metal of lower sulphur content than with the former process, thus giving uniformly higher malleability and ductility for the alloy. Many of the former steps, such as flux addition in roasting, leaching and additional roasting, leaching, drying and grinding have been done away with, thus greatly reducing the cost of production. The product from unit of equipment is greatly increased, and the use of low sulphur fuel in the final furnace is unnecessary, as sulphur is reduced therein.

It will be understood that the step of utilizing the original heat of the roasted material to cause a reaction with carbonaceous material and thus reduce at least partially to metallic form, may be used with or without the other steps; and also that the final furnace step wherein sulphur is reduced by a basic slag may be carried out whether the step of adding charcoal to the hot calcined material is employed or not.

Many other changes may be made in the furnaces used, the place and time of addition of the carbon, etc., without departing from my invention.

I claim:

1. In the manufacture of nickel and copper alloys, the steps consisting of roasting a nickel-copper matte, and then subjecting the product to a melting temperature in a furnace in the presence of sulphur-removing slag material.

2. In the manufacture of nickel and copper alloys, the steps consisting of roasting a nickel-copper matte, and then melting the calcined material in a furnace with basic slag material to remove further sulphur.

3. In the manufacture of nickel and copper alloys, the steps consisting of roasting a nickel-copper matte, and then melting the resulting material in a basic electric furnace in the presence of sulphur-removing material.

4. In the manufacture of nickel-copper alloys, the steps consisting of removing part of the sulphur content of a nickel-copper matte by roasting, and then smelting the resulting product in a basic furnace and further reducing the sulphur therein.

5. In the manufacture of nickel-copper alloys, the steps consisting of calcining a nickel-copper matte, and then adding carbon to the roasted material while retaining at least a portion of its original heat, to partially reduce at least a portion of the oxides to metal preparatory to further furnace operation.

6. In the manufacture of nickel-copper alloys, the steps consisting of calcining a nickel-copper matte, adding carbon to the matte while retaining at least a portion of its original heat, and then treating the product in a basic lined furnace and reducing the sulphur therein.

7. In the manufacture of nickel-copper alloys, the steps consisting of calcining a nickel-copper matte, at least partially reducing the resulting oxides to metallic form, and then charging the metallized material into a basic lined furnace and further reducing the sulphur therein.

8. In the manufacture of nickel-copper alloys, the steps consisting of calcining a nickel-copper matte, at least partially reducing the resulting oxides to metallic form, and then charging the metallized material into a basic lined electric furnace and further reducing the sulphur therein.

9. In the manufacture of nickel-copper alloys, the steps consisting of calcining a nickel-copper matte, then reducing a portion of the oxides to metallic form, and then smelting the material in a basic furnace and reducing the remaining oxides to metal and lowering the sulphur content therein.

10. In the manufacture of alloys, the steps consisting of roasting a matte containing the alloy metals, partially reducing the sulphur content during this step, and then melting the product in a furnace with basic materials to reduce the oxides to metallic form and further reduce the sulphur.

11. In the manufacture of alloys, the steps consisting of calcining a matte containing the alloy metals, at least partially reducing the resulting oxides to metallic form, and then treating the partially metallized material in a basic furnace to further reduce the oxides and also lower the sulphur content.

12. In the manufacture of alloys, the steps consisting of roasting a matte containing alloy metals, partially reducing the sulphur content during this step, and then treating the product in an electric furnace with basic materials to further reduce the sulphur and bring the alloy to metallic form.

In testimony whereof I have hereunto set my hand.

ROBERT C. STANLEY.